United States Patent
Feilen et al.

(10) Patent No.: US 12,176,964 B2
(45) Date of Patent: Dec. 24, 2024

(54) METHOD AND SYSTEM FOR DETERMINING A TRANSFER FUNCTION OF AN RX PATH

(71) Applicant: Rohde & Schwarz GmbH & Co. KG, Munich (DE)

(72) Inventors: Michael Feilen, Hoehenkirchen-Siegertsbrunn (DE); Martin Oetjen, Groebenzell (DE)

(73) Assignee: Rohde & Schwawrz GmbH & Co. KG

( * ) Notice: Subject to any disclaimer, the term of this patent is extended or adjusted under 35 U.S.C. 154(b) by 448 days.

(21) Appl. No.: 17/562,300

(22) Filed: Dec. 27, 2021

(65) Prior Publication Data
US 2023/0208537 A1 Jun. 29, 2023

(51) Int. Cl.
*H04B 17/309* (2015.01)
*H04L 5/00* (2006.01)

(52) U.S. Cl.
CPC ......... *H04B 17/309* (2015.01); *H04L 5/0048* (2013.01)

(58) Field of Classification Search
CPC .. H04B 17/0085; H04B 17/21; H04B 17/254; H04B 17/29; H04B 17/309; H04B 17/318; H04L 5/0048
See application file for complete search history.

(56) References Cited

U.S. PATENT DOCUMENTS

| | | | |
|---|---|---|---|
| 6,426,680 B1 | 7/2002 | Duncan et al. | |
| 10,264,405 B1* | 4/2019 | Manku | G08B 13/2494 |
| 10,805,015 B1* | 10/2020 | Dressel | G01R 27/32 |
| 2007/0171399 A1* | 7/2007 | Froggatt | G01N 21/21 |
| | | | 356/73.1 |
| 2016/0105213 A1* | 4/2016 | Hua | H04B 1/525 |
| | | | 370/278 |
| 2021/0058110 A1* | 2/2021 | Zhang | H04B 1/582 |

* cited by examiner

*Primary Examiner* — Ayaz R Sheikh
*Assistant Examiner* — David Zhijun Sun
(74) *Attorney, Agent, or Firm* — Westman, Champlin & Koehler, P.A.

(57) ABSTRACT

A method for determining a transfer function of an RX path of a receiver comprises applying a connector signal at a first measurement time. A connector signal response signal is measured. A first reference signal is applied and a first detector signal is measured by a detector, in response to the first reference signal passing through a second reference signal insertion path of the receiver. A first reference signal response signal is measured in response to the first reference signal passing through a second reference signal insertion path of the receiver. A second reference signal is applied and a second detector signal and a second reference signal response signal are measured. The transfer function of the RX path of the receiver is determined based on the connector signal, first detector signal, first reference signal response signal, second detector signal, and second reference signal response signal.

15 Claims, 4 Drawing Sheets

METHOD AND SYSTEM FOR DETERMINING A TRANSFER FUNCTION OF AN RX PATH

TECHNICAL FIELD

The present invention relates to a method and a system for determining a transfer function of a receive (RX) path of a receiver.

BACKGROUND

Receivers are present in electronic devices of all kinds to receive signals. For example, receivers of radar devices receive radar signals reflected from external objects. As another example, mobile devices comprise antenna for receiving signals from base stations to provide communication with a network and/or other mobile devices.

Receivers comprise RX paths with components such as low noise amplifiers, which can have an effect on the signal received at an input of the receiver. The influence on the signal can be described by a transfer function. The transfer function models the output of the RX path for possible inputs. In general, the transfer function depends on the frequency of the received signal.

The transfer function can be determined by applying a test signal to the RX path and by measuring the response to the test signal after the test signal propagates through the RX path. The signal may have a varying frequency. Voltage control oscillators for providing a variable frequency source are known from U.S. Pat. No. 6,426,680 B1. A method for calibrating measurement equipment is known from US 2007/0171399 A1.

A detector for measuring the response to the test signal can be placed in front of the RX path. However, the detector itself will have an influence on the response to the test signal. Namely, there can result signal attenuation before the LNA because of the high insertion loss of the detector. As a consequence, the noise figure degrades.

Therefore, there is a problem of determining the transfer function of an RX path with a reduced path noise figure.

SUMMARY

The present invention solves this problem by a method and a system for determining the transfer function of an RX path of a receiver having the features of the independent claims. Further advantageous embodiments are subject matter of the dependent claims.

According to a first aspect, the invention provides a method for determining a transfer function of an RX path of a receiver. The RX path comprises a low noise amplifier, LNA, of the receiver. At a first measurement time, a connector signal is applied to a connector. The connector is connected to an input unit of the receiver. A connector signal response signal at a measurement output of the receiver is measured in response to the connector signal passing through the RX path of the receiver. At the first measurement time, a first reference signal is applied to the input unit of the receiver. A first detector signal is measured by a detector, in response to the first reference signal passing through a first reference signal insertion path of the receiver. A first reference signal response signal is measured at the measurement output, in response to the first reference signal passing through a second reference signal insertion path of the receiver. The second reference signal insertion path comprises the LNA. The detector is connected in parallel with the LNA. At a second measurement time, a second reference signal is applied to the input unit of the receiver. A second detector signal is measured by the detector, in response to the second reference signal passing through the first reference signal insertion path of the receiver. A second reference signal response signal is measured at the measurement output, in response to the second reference signal passing through the second reference signal insertion path of the receiver. The transfer function of the RX path of the receiver is determined based on the connector signal, the first detector signal, the first reference signal response signal, the second detector signal, and the second reference signal response signal.

According to a second aspect, the invention provides a system for determining a transfer function of an RX path of a receiver, wherein the receive RX comprises a LNA of the receiver. A connector signal generator is configured to apply, at a first measurement time, a connector signal to a connector, wherein the connector is connected to an input unit of the receiver. A measurement device is configured to measure, at the first measurement time, a connector signal response signal at a measurement output of the receiver, in response to the connector signal passing through the RX path of the receiver. A reference signal generator is configured to apply, at the first measurement time, a first reference signal to the input unit of the receiver. A detector is configured to measure, at the first measurement time, a first detector signal, in response to the first reference signal passing through a first reference signal insertion path of the receiver. The measurement device is configured to measure a first reference signal response signal at the measurement output, in response to the first reference signal passing through a second reference signal insertion path of the receiver. The second reference signal insertion path comprises the LNA. The detector is connected in parallel with the LNA. The reference signal generator is configured to apply, at a second measurement time, a second reference signal to the input unit of the receiver, wherein the detector is configured to measure a second detector signal, in response to the second reference signal passing through the first reference signal insertion path of the receiver, and wherein the measurement device is configured to measure a second reference signal response signal at the measurement output, in response to the second reference signal passing through the second reference signal insertion path of the receiver. A determination unit is configured to determine the transfer function of the RX path of the receiver, based on the connector signal, the first detector signal, the first reference signal response signal, the second detector signal, and the second reference signal response signal.

The invention allows the determination of the transfer function of an RX path of a receiver with a reduced path noise figure. A detector is connected in parallel with the LNA. Accordingly, there are no insertion losses during normal operation with the signal passing through the LNA. That is, during normal operation, the signal does typically not pass through the detector.

In general, the transfer function may change in the time range between the first measurement time and the second measurement time. Causes for such a change in the transfer function of the RX path comprise temperature effects, humidity effects and aging effects. However, during the first measurement time and the second measurement time, respectively, the transfer function remains constant. Based on the connector signal, the first detector signal, the first reference signal response signal, the second detector signal, and the second reference signal response signal, it is possible to determine the transfer function of the RX path at the second measurement time. All changes to the transfer function are taken into account.

The measurements at the second measurement time do not require the generation of an external connector signal and can therefore be repeated at any time. Accordingly, the transfer function can be easily determined at any desired time (second measurement time).

According to a preferred embodiment of the method for determining the transfer function of the RX path of the receiver, the steps of applying the second reference signal, measuring the second detector signal and measuring the second reference signal response signal are repeated for a plurality of subsequent measurement times. For each of the subsequent measurement times, the transfer function of the RX path is determined based on the connector signal, the first detector signal and the first reference signal response signal (obtained at the first measurement time), as well as the second detector signal and the second reference signal response signal (obtained at the respective subsequent measurement time).

According to a preferred embodiment of the method for determining the transfer function of the RX path of the receiver, the detector is switched on at the first measurement time and the second measurement time and is switched off at a time between the first measurement time and the second measurement time. The detector is only used for measurements. Turning off the detector if the detector is not needed can save energy.

According to a preferred embodiment of the method for determining the transfer function of the RX path of the receiver, the receiver comprises a switch for selecting a first path comprising the LNA or a second path comprising the detector. The first path is selected for measuring the connector signal response signal, the first reference signal response signal and the second reference signal response signal. The second path is selected for measuring the first detector signal and the second detector signal. The first path may also be used for normal use of the receiver.

According to a preferred embodiment of the method for determining the transfer function of the RX path of the receiver, signal characteristics of the first reference signal correspond to signal characteristics of the second reference signal. Preferably, the signal characteristics of the first reference signal and the second reference signal are the same. By using reference signals with identical signal characteristics, the transfer function of the RX path can be directly computed from the measured signals. The connector signal may also have the same signal characteristics as the first reference signal and the second reference signal. Signal characteristics may comprise a time-dependence and/or frequency dependence of the respective signals.

According to a preferred embodiment of the method for determining the transfer function of the RX path of the receiver, the transfer function $H_{CON \to RX(tb)}$ of the RX path of the receiver is determined according the following formula:

$$H_{CON \to RX(tb)} = \frac{S_{DET(ta),3}}{S_{RX(ta),2}} \cdot \frac{S_{RX(tb),2}}{S_{DET(tb),3}} \cdot \frac{S_{RX(ta),1}}{S_{CON}}$$

wherein $S_{CON}$ denotes the connector signal, $S_{RX(ta),1}$ denotes the connector signal response signal, $S_{DET(ta),3}$ denotes the first detector signal, $S_{RX(ta),2}$ denotes the first reference signal response signal, $S_{DET(tb),3}$ denotes the second detector signal, and $S_{RX(tb),2}$ denotes the second reference signal response signal. The transfer function of the RX path can therefore be computed by simple multiplication and division of the measured signals. Herein, the signals are denoted by S with an appropriate index and can generally refer to complex signals, i.e. comprising both an amplitude and a phase.

According to a preferred embodiment of the method for determining the transfer function of the RX path of the receiver, in normal operation of the receiver, a path comprising the LNA can be disconnected and a parallel path comprising the detector can be connected to operate as an attenuator. Therefore, normal operation of the receiver may comprise a first mode, where the LNA is used to amplify the received external signal, and a second mode, wherein the detector is used to attenuate the received signal. The detector can therefore be used both for measuring the transfer function and for providing an attenuation functionality. The number of additional components can therefore be reduced for applications which require the attenuation functionality.

According to a preferred embodiment of the method for determining the transfer function of the RX path of the receiver, the detector is an internal detector of the receiver. That is, the detector can be part of the receiver.

According to a preferred embodiment of the method for determining the transfer function of the RX path of the receiver, the detector is an external detector which can be disconnected from the receiver. The external detector may comprise an oscilloscope, a vector network analyzer or the like. By connecting the detector only during the first and second measurements, the receiver can be more compact.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
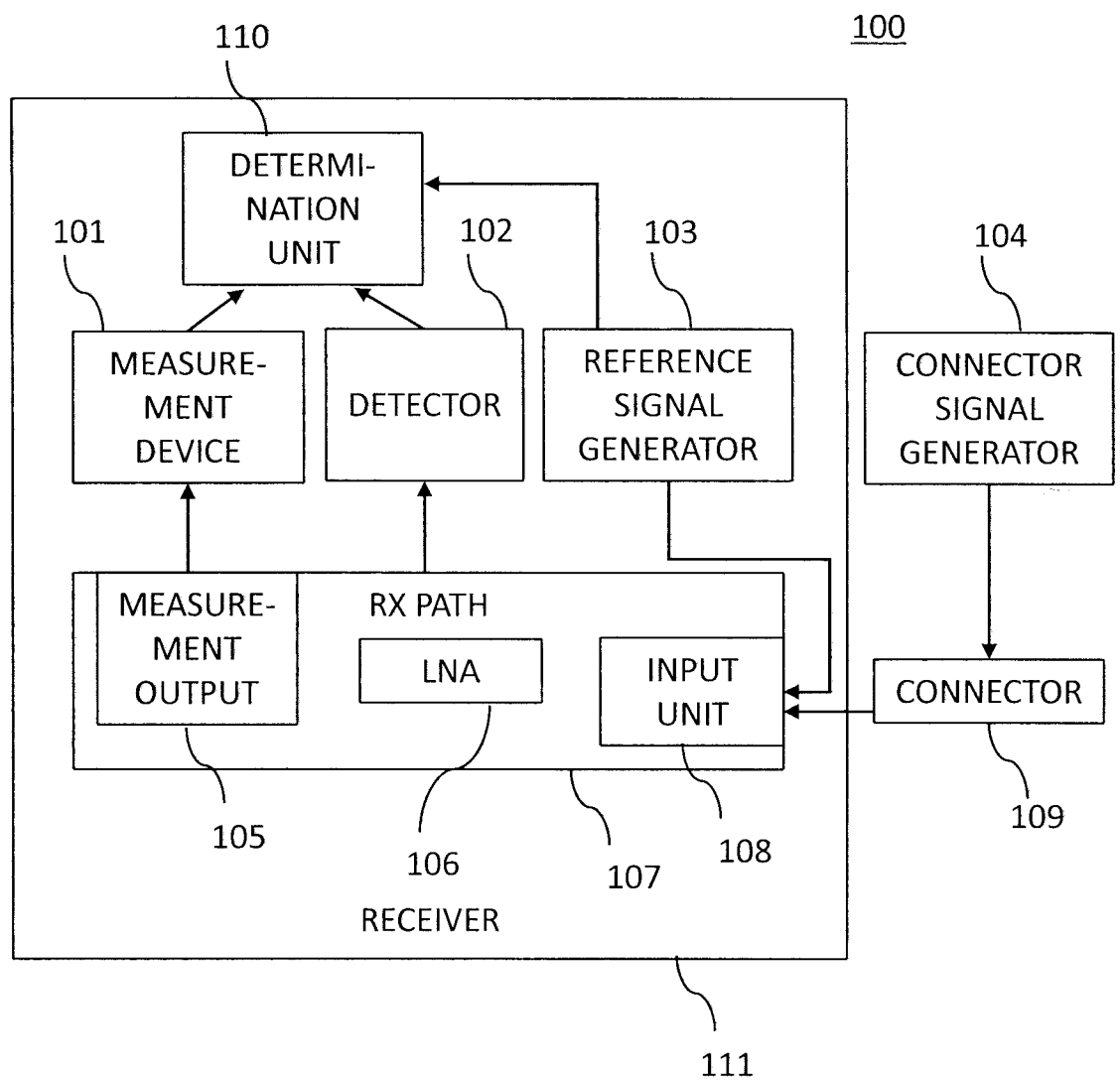
FIG. 1 shows a schematic block diagram of a system for determining a transfer function of an RX path of a receiver according to an embodiment of the invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

FIG. 1 shows a schematic block diagram of a system 100 for determining a transfer function of an RX path 107 of a receiver 111. The RX path 107 comprises a low noise amplifier, LNA, 106. The RX path 107 further comprises an input unit 108 for receiving signals. The input unit 108 may comprise one or more inputs for receiving signals from different signal sources. The input unit 108 may also comprise at least one switch for selecting one of the inputs.

The input unit 108 is connected to a connector 109 for receiving a connector signal. In accordance with the invention, the connector signal may be an external signal generated by a connector signal generator 104.

For example, the connector signal generator 104 may be connected via a cable to the connector 109 and may provide the connector signal via the cable to the input 108 of the RX path 107.

According to other embodiments, the connector signal generator 104 may generate a wireless signal received by the connector 109 and provided to the input 108 of the RX path 107. For example, the connector 109 can comprise antennas for receiving electromagnetic wave signals generated by the connector signal generator 104. The connector signal generator 104 may also comprise antennas to emit the electromagnetic wave signals. For example, the connector signal generator 104 may comprise radar antennas of a transmission, TX, path of a radar device. The radar device may also comprise the receiver 111.

At a first measurement time, the connector signal generator 104 applies the connector signal $S_{CON}$ to the connector 109. The connector signal $S_{CON}$ is provided to the input 108 of the RX path 107 and passes through the RX path 107. In particular, the connector signal $S_{CON}$ passes through the LNA 106 of the RX path 107.

At the first measurement time, a measurement device 101 of the receiver measures a connector signal response signal at a measurement output 105 of the receiver. The connector signal response signal is a response signal to the connector signal, i.e., the signal that occurs at the measurement output 105 as a result of the connector signal being provided at the input 108. Herein, the measurement output 105 is arranged behind the LNA 106, i.e. the connector signal first passes the LNA 106.

The measurement device 101 is an internal device of the receiver 111 which may be permanently connected to the measurement output 105. To reduce energy, the measurement device 101 may be switched off. For example, the measurement device 101 can be switched off at all times apart from the measurement times. In particular, the measurement device 110 can be switched off during normal operation of the RX path 107. Herein, normal operation refers to the intended use of the receiver 111, other than the determination of the transfer function of the RX path 107.

At the first measurement time, a reference signal generator 103 applies a first reference signal to the input unit 108 of the receiver 111. Herein, the input unit 108 may comprise different inputs (connections) and the reference signal may be applied to a different input than the connector signal. The input unit 108 may comprise a switch to select between the respective signals, i.e. the reference signal or the connector signal.

A detector 102 measures, at the first measurement time, a first detector signal, in response to the first reference signal passing through a first reference signal insertion path of the receiver 107. The detector 102 is connected in parallel with the LNA 106. That is, the first reference signal insertion path does not comprise the LNA 106 and the RX path 107 does not comprise the detector 102.

The detector 102 is an internal device of the receiver 111 which may be permanently connected to the RX path 107. To reduce energy, the detector 102 may be switched off. For example, the detector 102 can be switched off at all times apart from the measurement times. In particular, the detector 102 can be switched off during normal operation of the RX path 107.

At the first measurement time, the measurement device 101 measures a first reference signal response signal at the measurement output 105, in response to the first reference signal passing through a second reference signal insertion path of the receiver. The second reference signal insertion path comprises the LNA 106 but not the detector 102. The second reference signal insertion path therefore essentially overlaps with the RX path 107.

According to an embodiment, the first reference signal insertion path and the second reference signal insertion path are successively selected and the respective first detector signal and first reference signal response signal are measured. Herein, the first reference signal insertion path and the second reference signal insertion path may be selected in any desired order.

According to an embodiment, during the whole measurement time, the reference signal generator 103 may continuously apply the first reference signal. According to another embodiment, the reference signal generator 103 may apply the first reference signal while the first path of the first reference signal insertion path and the second reference signal insertion path is selected and may then again apply the first reference signal while the second path of the first reference signal insertion path and the second reference signal insertion path is selected. While changing paths, no signal is applied.

According to the embodiment shown in FIG. 1, the detector 102 and the measurement device 101 are separate devices. According to further embodiments, the measurement device 101 and the detector 102 is the same device.

The measurement device 101 and the detector 102 are both configured to detect the respective signals, i.e., to measure a time-dependent and/or frequency-dependent signal. According to some embodiments, the measurement device 101 and/or the detector 102 is an oscilloscope, a vector network analyzer or the like. The measurement device 101 and/or the detector 102 may comprise hardware and/or software components to analyze the signal, e.g., to perform a Fourier transformation, Laplace transformation or the like.

At a second measurement time, the reference signal generator 103 applies a second reference signal to the input unit 108 of the receiver 111. The second reference signal corresponds to the first reference signal. For example, signal characteristics such as a time dependency and/or a frequency dependency of the first and second reference signals are essentially the same.

Herein, the first and second reference signals can be signals with a predetermined waveform, e.g. sine waves, square waves, triangle waves, sawtooth waves, or the like. The reference signal generator 103 may also comprise a frequency sweep generator for sweeping the frequency of the first and second reference signals. In this way, the transfer function of the RX path can be determined as a function of frequency.

The detector 102 measures a second detector signal, in response to the second reference signal passing through the first reference signal insertion path of the receiver 111.

Likewise, the measurement device 101 measures a second reference signal response signal at the measurement output

105, in response to the second reference signal passing through the second reference signal insertion path of the receiver 111.

Herein, the terms "at the first measurement time" and "at the second measurement time" can denote that the respective signals, i.e. the connector signal and the reference signal, are applied within a short timeframe, e.g. within seconds, minutes, or hours. Herein, the timeframe is short as compared to the time difference between the first measurement time and the second measurement time, which can be in the order of days, weeks, months or years. "Short timeframe" can also mean that the transfer function of the RX path 107 stays essentially constant within said timeframe. However, the transfer function may change between the first measurement time and the second measurement time, e.g., due to temperature effects, humidity effects or aging effects of the receiver 111.

A determination unit 110 determines the transfer function of the RX path 107 of the receiver 111, based on the connector signal, the first detector signal, the first reference signal response signal, the second detector signal, and the second reference signal response signal.

The determination unit 110 can comprise at least one of a central processing unit (CPU) or graphics processing unit (GPU) like a microcontroller (µC), an integrated circuit (IC), an application-specific integrated circuit (ASIC), an application-specific standard product (ASSP), a digital signal processor (DSP), a field programmable gate array (FPGA) and the like.

Figure 2:
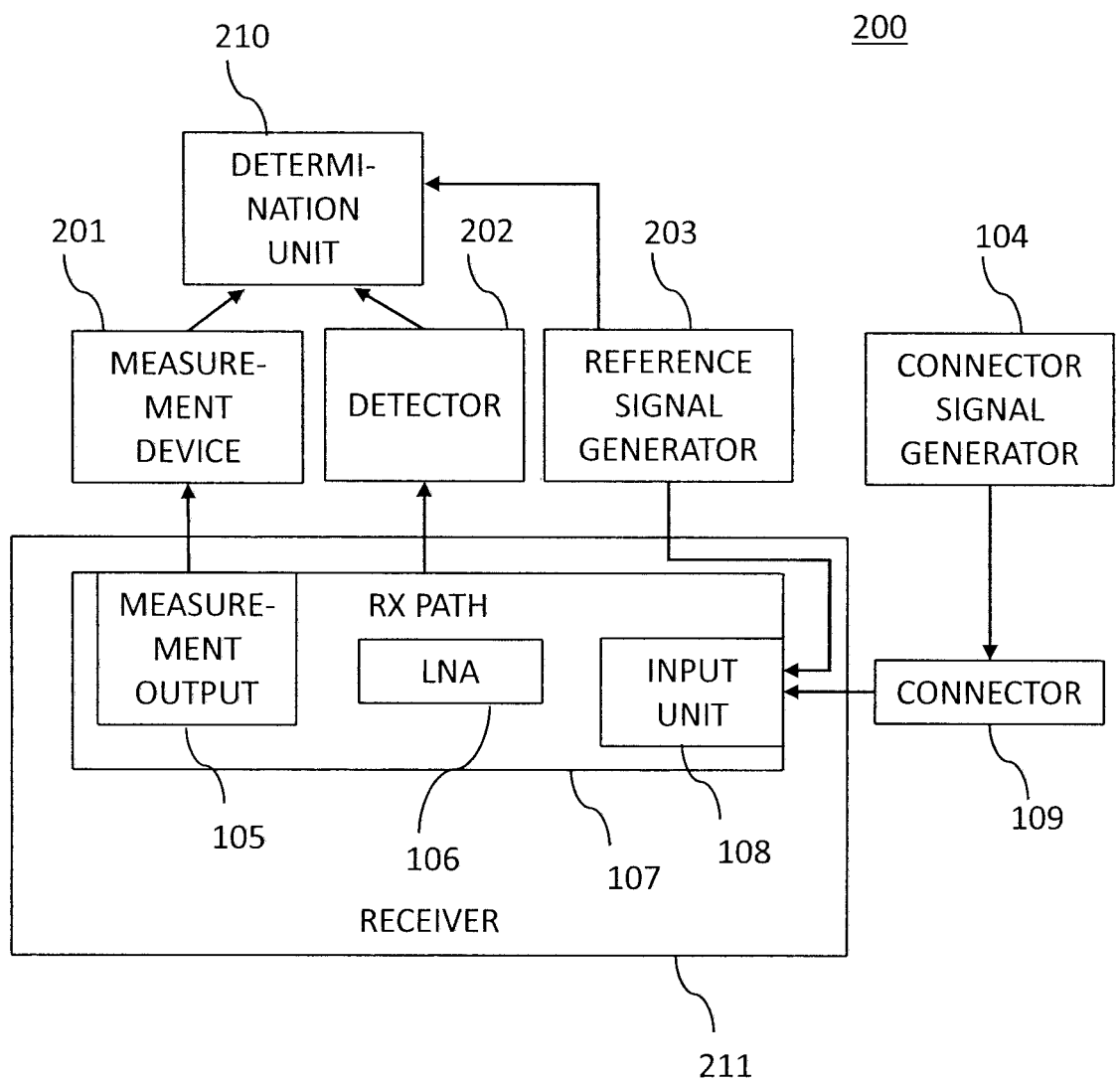
FIG. 2 shows a schematic block diagram of a system for determining a transfer function of an RX path of a receiver according to another embodiment of the invention.

FIG. 2 shows a schematic block diagram of a system 200 for determining a transfer function of an RX path 107 of a receiver 211 according to another embodiment of the invention. In contrast to the embodiment shown in FIG. 1, determination unit 210, measurement device 201, detector 202 and reference signal generator 203 are devices external to the receiver 211. The determination unit 210, the measurement device 201, the detector 202 and the reference signal generator 203 may be a part of the same device, e.g., an oscilloscope, a network analyzer or the like. According to other embodiments, at least some of said devices may be separate devices.

The invention is not restricted to the shown embodiment. According to further embodiments, only some of the determination unit 210, the measurement device 201, the detector 202 and the reference signal generator 203 are a part of the receiver 211 while others are external devices.

In the following, it will be explained in more detail how the determination unit 110, 210 may determine the transfer function of the RX path 107.

Figure 3:
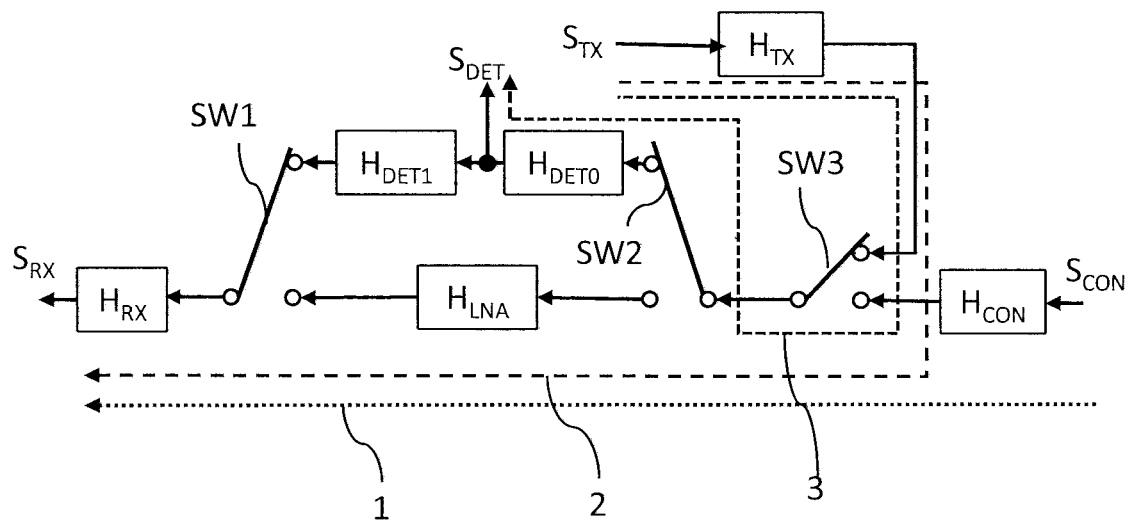
FIG. 3 illustrates the flow of several signals to illustrate the determination of the transfer function of an RX path of a receiver according to the invention.

FIG. 3 illustrates the flow of several signals to illustrate the determination of the transfer function of the RX path 107. The transfer function $H_{CON \to RX(tb)}$ is defined as follows:

$$H_{CON \to RX(tb)} = S_{RX}/S_{CON},$$

where $S_{CON}$ is the external signal (connector signal) at the connector 109 and $S_{RX}$ is the response signal at the measurement output 105, in response to the external signal passing through the RX path 107.

Each component in the signal paths contributes a factor corresponding to a respective transfer function. The relevant transfer functions are defined as follows:

$H_{TX}$ denotes the transfer function of the reference signal generator 203;

$H_{CON}$ denotes the transfer function of the connector 109;

$H_{DET0}$ denotes the transfer function of the detector 202 with respect to a section of the signal path in the direction of the input unit 108;

$H_{DET1}$ denotes the transfer function of the detector 202 with respect to a section of the signal path in the direction of the measurement output 105;

$H_{LNA}$ denotes the transfer function of the LNA; and $H_{RX}$ denotes the transfer function of the measurement output 105 and measurement device 101, 201.

It is to be understood that the RX path 107 may comprise further devices and components in addition to the LNA. The influence of all these components might be understood to be included in the transfer function $H_{LNA}$.

The signals used for determining the transfer function of the RX path 107 depend on these transfer functions as follows:

$$S_{RX(ta),1} = H_{RX(ta)} \cdot H_{LNA(ta)} \cdot H_{CON} \cdot S_{CON}$$

$$S_{DET(ta),3} = H_{TX(ta)} \cdot H_{DET0} \cdot S_{TX}$$

$$S_{RX(ta),2} = H_{RX(ta)} \cdot H_{LNA(ta)} \cdot H_{TX(ta)} \cdot S_{TX}$$

$$S_{DET(tb),3} = H_{TX(tb)} \cdot H_{DET0} \cdot S_{TX}$$

$$S_{RX(tb),2} = H_{RX(tb)} \cdot H_{LNA(tb)} \cdot H_{TX(tb)} \cdot S_{TX}$$

Herein, $S_{CON}$ denotes the connector signal, $S_{RX(ta),1}$ denotes the connector signal response signal, $S_{DET(ta),3}$ denotes the first detector signal, $S_{RX(ta),2}$ denotes the first reference signal response signal, $S_{DET(tb),3}$ denotes the second detector signal, and $S_{RX(tb),2}$ denotes the second reference signal response signal.

The index "ta" refers to the first measurement time and the index "tb" refers to the second measurement time.

The index "1" refers to the RX path 1, the index "2" refers to the second reference signal insertion path 2, and the index "3" refers to the first reference signal insertion path 3.

A first switch SW1 and a second switch SW2 are provided to select between the receive path 1 and a parallel path including the detector 102, 202. By selecting the parallel path, the detector 102, 202 can be used as an attenuator.

A third switch SW3 is provided to select between a) the receive path 1 or b) one of the first and second reference signal insertion paths 2, 3.

The determination unit 110, 210 receives the respective signals from the measurement device 101, 201 and the detector 102, 202 and computes the transfer function $H_{CON \to RX(tb)}$ of the RX path 1, 107 based on the connector signal $S_{CON}$, the connector signal response signal $S_{RX(ta),1}$, the first detector signal $S_{DET(ta),3}$, the first reference signal response signal $S_{RX(ta),2}$, the second detector signal $S_{DET(tb),3}$, and the second reference signal response signal $S_{RX(tb),2}$ as follows:

$$H_{CON \to RX(tb)} = \frac{S_{RX(tb)}}{S_{CON}} = \frac{S_{DET(ta),3}}{S_{RX(ta),2}} \cdot \frac{S_{RX(tb),2}}{S_{DET(tb),3}} \cdot \frac{S_{RX(ta),1}}{S_{CON}} = H_{RX(tb)} \cdot H_{LNA(tb)} \cdot H_{CON}$$

The second line follows from inserting the formula of the transfer functions as indicated above.

Figure 4:
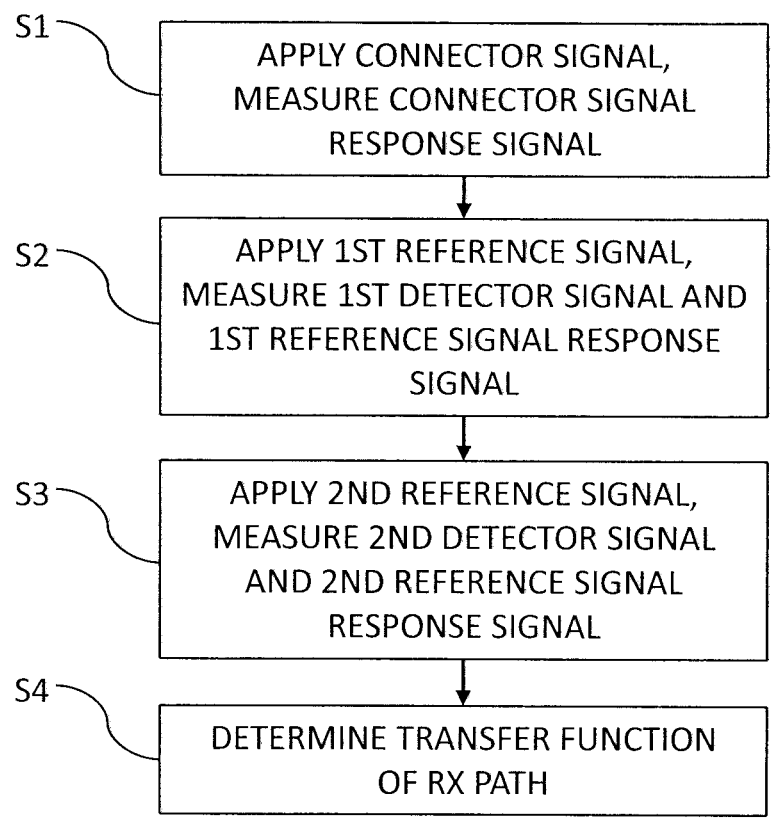
FIG. 4 shows a flow diagram illustrating a method for determining a transfer function of an RX path of a receiver according to an embodiment of the invention.

FIG. 4 shows a flow diagram illustrating a method for determining a transfer function of an RX path 1, 107 of a receiver 111, 211. The method may be carried out by one of the systems 100, 200 described above.

The RX path 1, 107 comprises a low noise amplifier, LNA, of the receiver 111, 211.

At step S1, at a first measurement time, a connector signal is applied to a connector 109 which is connected to an input unit 108 of the receiver 111, 211. A connector signal response signal at a measurement output of the receiver is measured in response to the connector signal passing through the RX path 1, 107 of the receiver 111, 211.

At step S2, still at the first measurement time, a first reference signal is applied to the input unit 108 of the receiver 111, 211. A first detector signal is measured by a detector 102, 202, in response to the first reference signal passing through a first reference signal insertion path 3 of the receiver 111, 211.

A first reference signal response signal is measured at the measurement output 105, in response to the first reference signal passing through a second reference signal insertion path 2 of the receiver 111, 211. Herein, the second reference signal insertion path 2 comprises the LNA 106 but does not comprise the detector 102, 202 which is connected in parallel with the LNA 106. In turn, the first reference signal insertion path 3 comprises the detector 102, 202 but does not comprise the LNA 106.

At step S3, at a second measurement time, a second reference signal is applied to the input unit 108 of the receiver 111, 211. The second measurement time may be considerably later than the first measurement time. The system 100, 200 may also be located at another location at the second measurement time as compared to at the first measurement time.

A second detector signal is measured by the detector 102, 202, in response to the second reference signal passing through the first reference signal insertion path 3 of the receiver.

A second reference signal response signal is measured at the measurement output 105, in response to the second reference signal passing through the second reference signal insertion path 2 of the receiver 111, 211.

At step S4, the transfer function of the RX path 1, 107 of the receiver 111, 211 is determined based on the connector signal, the first detector signal, the first reference signal response signal, the second detector signal, and the second reference signal response signal.

Summarizing, the invention relates to a method and a system for reliably determining a transfer function of an RX path 1, 107 of a receiver 111, 211 with a significantly reduced insertion loss.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A method for determining a transfer function of a receive, RX, path of a receiver, wherein the RX path comprises a low noise amplifier, LNA, of the receiver, wherein the method comprises the steps:

applying, at a first measurement time, a connector signal to a connector, wherein the connector is connected to an input unit of the receiver, and measuring a connector signal response signal at a measurement output of the receiver, in response to the connector signal passing through the RX path of the receiver;

applying, at the first measurement time, a first reference signal to the input unit of the receiver, measuring a first detector signal by a detector, in response to the first reference signal passing through a first reference signal insertion path of the receiver, and measuring a first reference signal response signal at the measurement output, in response to the first reference signal passing through a second reference signal insertion path of the receiver, wherein the second reference signal insertion path comprises the LNA, and wherein the detector is connected in parallel with the LNA;

applying, at a second measurement time, a second reference signal to the input unit of the receiver, measuring a second detector signal by the detector, in response to the second reference signal passing through the first reference signal insertion path of the receiver, and measuring a second reference signal response signal at the measurement output, in response to the second reference signal passing through the second reference signal insertion path of the receiver; and determining the transfer function of the RX path of the receiver, based on the connector signal, the connector signal response signal, the first detector signal, the first reference signal response signal, the second detector signal, and the second reference signal response signal.

2. The method according to claim 1, wherein the detector is switched on at the first measurement time and at the second measurement time and is switched off at a time between the first measurement time and the second measurement time.

3. The method according to claim 1, wherein the receiver comprises a switch for selecting a first path comprising the LNA or a second path comprising the detector, wherein the first path is selected for measuring the first reference signal response signal and the second reference signal response signal, and wherein the second path is selected for measuring the first detector signal and the second detector signal.

4. The method according to claim 1, wherein signal characteristics of the first reference signal correspond to signal characteristics of the second reference signal.

5. The method according to claim 1, wherein the transfer function $H_{CON \rightarrow RX(tb)}$ of the RX path of the receiver is determined according the following formula:

$$H_{CON \rightarrow RX(tb)} = \frac{S_{DET(ta),3}}{S_{RX(ta),2}} \cdot \frac{S_{RX(tb),2}}{S_{DET(tb),3}} \cdot \frac{S_{RX(ta),1}}{S_{CON}}$$

wherein $S_{CON}$ denotes the connector signal, $S_{RX(ta),1}$ denotes the connector signal response signal, $S_{DET(ta),3}$ denotes the first detector signal, $S_{RX(ta),2}$ denotes the first reference signal response signal, $S_{DET(tb),3}$ denotes the second detector signal, and $S_{RX(tb),2}$ denotes the second reference signal response signal.

6. The method according to claim 1, wherein in normal operation of the receiver, a path comprising the LNA can be disconnected and a parallel path comprising the detector can be connected to operate as an attenuator.

7. The method according to claim 1, wherein the detector is an internal detector of the receiver.

8. The method according to claim 1, wherein the detector is an external detector which can be disconnected from the receiver.

9. A system for determining a transfer function of a receive, RX, path of a receiver, wherein the RX path comprises a low noise amplifier, LNA, of the receiver, comprising:
a connector signal generator configured to apply, at a first measurement time, a connector signal to a connector, wherein the connector is connected to an input unit of the receiver;
a measurement device, configured to measure, at the first measurement time, a connector signal response signal at a measurement output of the receiver, in response to the connector signal passing through the RX path of the receiver;
a reference signal generator, configured to apply, at the first measurement time, a first reference signal to the input unit of the receiver;
a detector, configured to measure, at the first measurement time, a first detector signal, in response to the first reference signal passing through a first reference signal insertion path of the receiver, wherein the measurement device is configured to measure a first reference signal response signal at the measurement output, in response to the first reference signal passing through a second reference signal insertion path of the receiver, wherein the second reference signal insertion path comprises the LNA, and wherein the detector is connected in parallel with the LNA;
wherein the reference signal generator is configured to apply, at a second measurement time, a second reference signal to the input unit of the receiver, wherein the detector is configured to measure a second detector signal, in response to the second reference signal passing through the first reference signal insertion path of the receiver, and wherein the measurement device is configured to measure a second reference signal response signal at the measurement output, in response to the second reference signal passing through the second reference signal insertion path of the receiver; and
a determination unit configured to determine the transfer function of the RX path of the receiver, based on the connector signal, the connector signal response signal, the first detector signal, the first reference signal response signal, the second detector signal, and the second reference signal response signal.

10. The system according to claim 9, wherein the detector is configured to be switched on at the first measurement time and the second measurement and is configured to be switched off at a time between the first measurement time and the second measurement time.

11. The system according to claim 9, wherein the receiver comprises a switch for selecting a first path comprising the LNA or a second path comprising the detector, wherein the switch is configured to select the first path for measuring the first reference signal response signal and the second reference signal response signal, and wherein the switch is configured to select the second path for measuring the first detector signal and the second detector signal.

12. The system according to claim 9, wherein the reference signal generator is configured to generate the second reference signal with signal characteristics corresponding to signal characteristics of the first reference signal.

13. The system according to claim 9, wherein the determination unit is configured to determine the transfer function
$H_{CON \rightarrow RX(tb)}$ of the RX path of the receiver according the following formula:

$$H_{CON \rightarrow RX(tb)} = \frac{S_{DET(ta),3}}{S_{RX(ta),2}} \cdot \frac{S_{RX(tb),2}}{S_{DET(tb),3}} \cdot \frac{S_{RX(ta),1}}{S_{CON}}$$

wherein $S_{CON}$ denotes the connector signal, $S_{RX(ta),1}$ denotes the connector signal
response signal, $S_{DET(ta),3}$ denotes the first detector signal, $S_{RX(ta),2}$ denotes the first reference signal response signal, $S_{DET(b),3}$ denotes the second detector signal, and $S_{RX(tb),2}$ denotes the second reference signal response signal.

14. The system according to claim 9, comprising a switch configured to disconnect a path comprising the LNA and to connected a parallel path comprising the detector operating as an attenuator.

15. The system according to claim 9, wherein the detector is an internal detector of the receiver, or wherein the detector is an external detector which can be disconnected from the receiver.

* * * * *